(12) United States Patent
Shaw

(10) Patent No.: US 7,474,524 B1
(45) Date of Patent: Jan. 6, 2009

(54) COMPUTER DOCKING SYSTEM

(76) Inventor: Antwain P. Shaw, 1569 Charlestown Dr., Edgewood, MD (US) 21040

( * ) Notice: Subject to any disclaimer, the term of this patent is extended or adjusted under 35 U.S.C. 154(b) by 0 days.

(21) Appl. No.: 11/563,114

(22) Filed: Nov. 24, 2006

(51) Int. Cl.
*G06F 1/16* (2006.01)

(52) U.S. Cl. .................... 361/683; 361/686; 312/223.1; 312/223.2; 710/303; 710/304

(58) Field of Classification Search ......... 361/679–683, 361/724–727; 248/917–923; 312/223.1, 312/223.2, 333; D14/332, 432–434
See application file for complete search history.

(56) References Cited

U.S. PATENT DOCUMENTS

| | | | | |
|---|---|---|---|---|
| 4,669,053 A * | 5/1987 | Krenz | .......................... | 361/680 |
| 4,881,839 A | 11/1989 | Grimm | | |
| 5,209,583 A * | 5/1993 | Lewis et al. | .................... | 400/88 |
| D338,487 S | 8/1993 | Martin | | |
| 5,364,196 A * | 11/1994 | Baitz et al. | .................... | 400/691 |
| D358,136 S * | 5/1995 | Samuelson | .................. | D14/106 |
| 5,595,074 A * | 1/1997 | Munro | .......................... | 70/58 |
| 5,647,484 A | 7/1997 | Fleming | | |
| 5,829,893 A | 11/1998 | Kinoshita et al. | | |
| 5,836,183 A * | 11/1998 | Derman | ......................... | 70/58 |
| 6,119,184 A * | 9/2000 | Takahama | ................... | 710/303 |
| 6,781,823 B1 * | 8/2004 | Nyack | ......................... | 361/683 |
| 6,811,006 B1 * | 11/2004 | Mundle | ....................... | 190/11 |
| 6,916,128 B1 | 7/2005 | Petteruti et al. | | |
| 2003/0063938 A1 | 4/2003 | Hardisty et al. | | |

* cited by examiner

*Primary Examiner*—Jayprakash N Gandhi
*Assistant Examiner*—Anthony Q. Edwards

(57) ABSTRACT

A computer docking system for receiving a laptop and printing data from the laptop includes a printer being electrically coupled to the laptop to print information from the laptop. The printer includes a top wall, a bottom wall and a peripheral wall extending between the top wall and the bottom wall. The printer is positioned under the laptop, wherein the laptop is supported on the top wall of the printer. A clamping assembly is mountable to the printer. The clamping assembly clamps the laptop to the printer to secure the laptop to the printer.

17 Claims, 6 Drawing Sheets

COMPUTER DOCKING SYSTEM

BACKGROUND OF THE INVENTION

1. Field of the Invention

The present invention relates to portable printing devices and more particularly pertains to a new portable printing device for receiving a laptop and printing data from the laptop.

2. Description of the Prior Art

The use of portable printing devices is known in the prior art. While these devices fulfill their respective, particular objectives and requirements, the need remains for a system that has certain improved features that secure a laptop to the system to inhibit the laptop from sliding off of the system. Additionally, the system prints data from the laptop when the laptop is electronically coupled to the system.

SUMMARY OF THE INVENTION

The present invention meets the needs presented above by generally comprising a printer being electrically coupled to a laptop to print information from the laptop. The printer includes a top wall, a bottom wall and a peripheral wall extending between the top wall and the bottom wall. The printer is positioned under the laptop, wherein the laptop is supported on the top wall of the printer. A clamping assembly is mountable to the printer. The clamping assembly clamps the laptop to the printer to secure the laptop to the printer.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
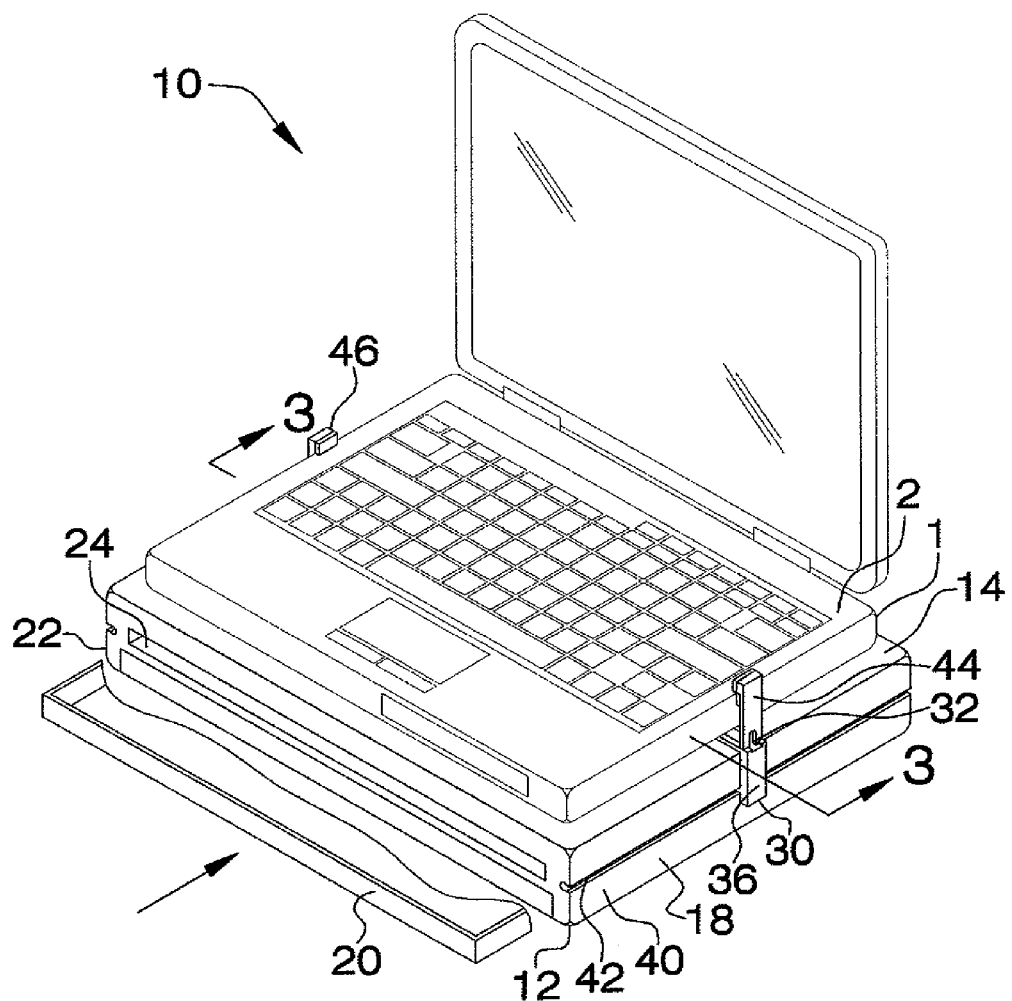
FIG. 1 is a front perspective view of a computer docking system according to the present invention shown in use.
Figure 2:
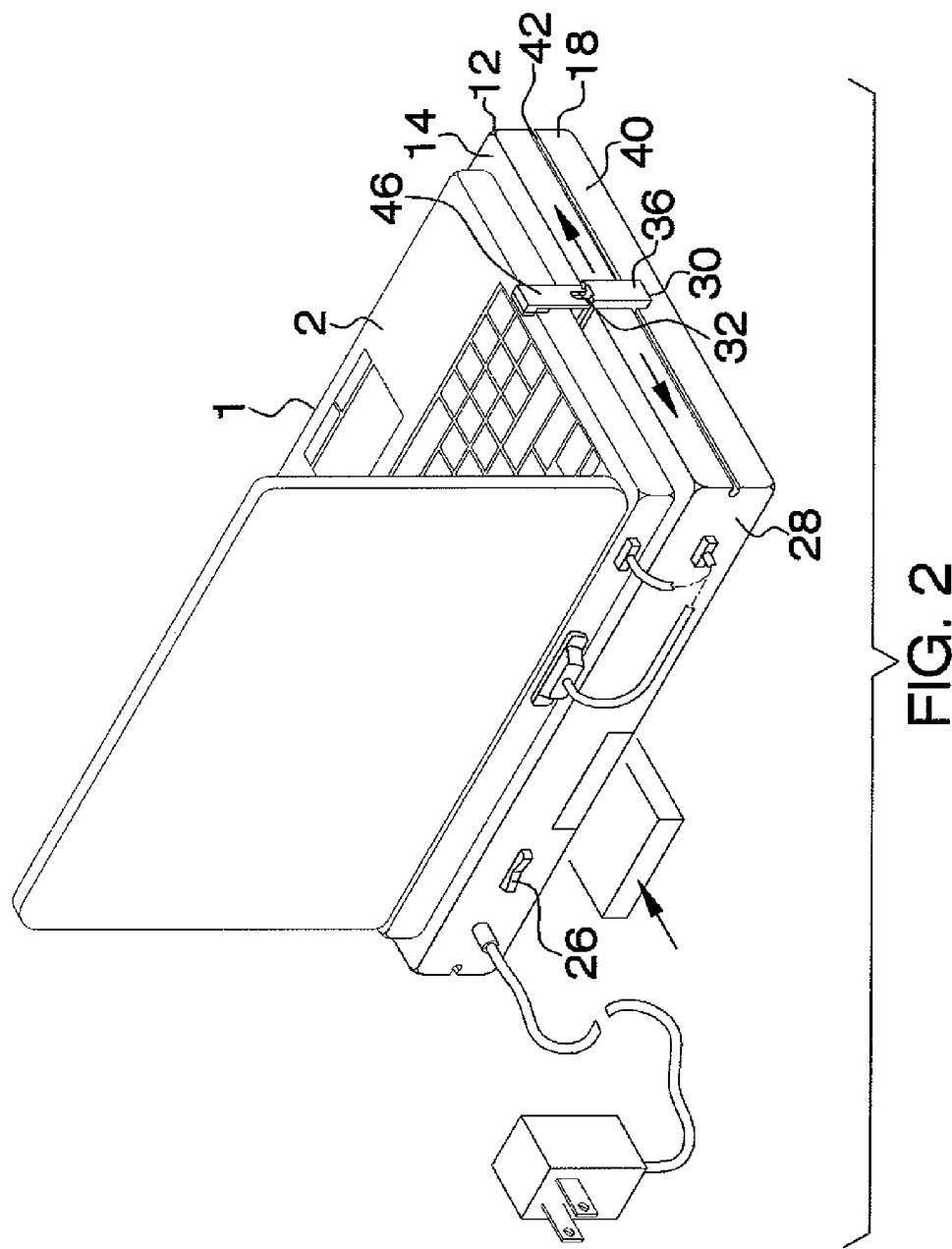
FIG. 2 is a rear perspective view of the present invention.
Figure 3:
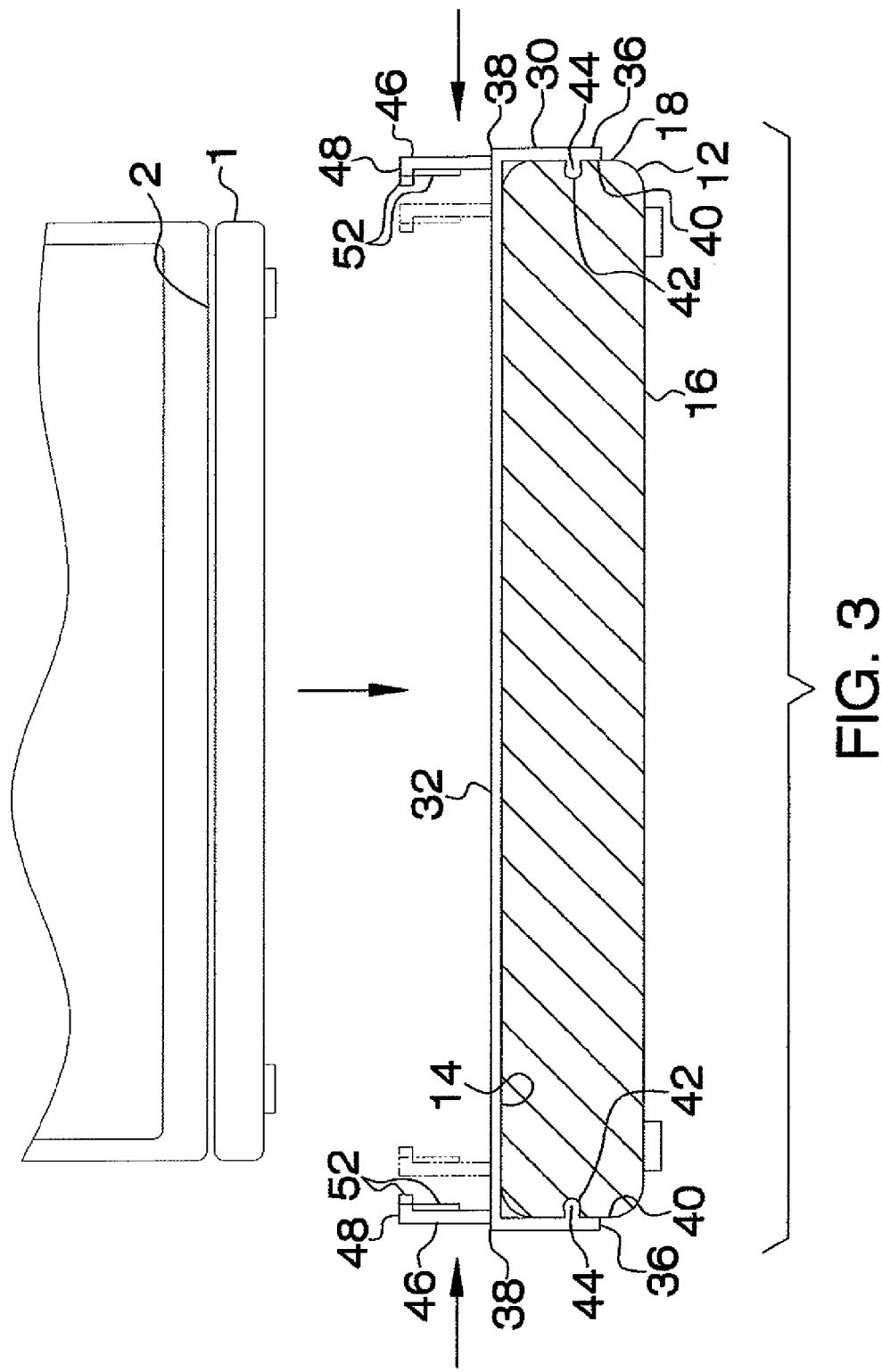
FIG. 3 is a cross-sectional view of the present invention taken along line 3-3 of FIG. 1.
Figure 4:
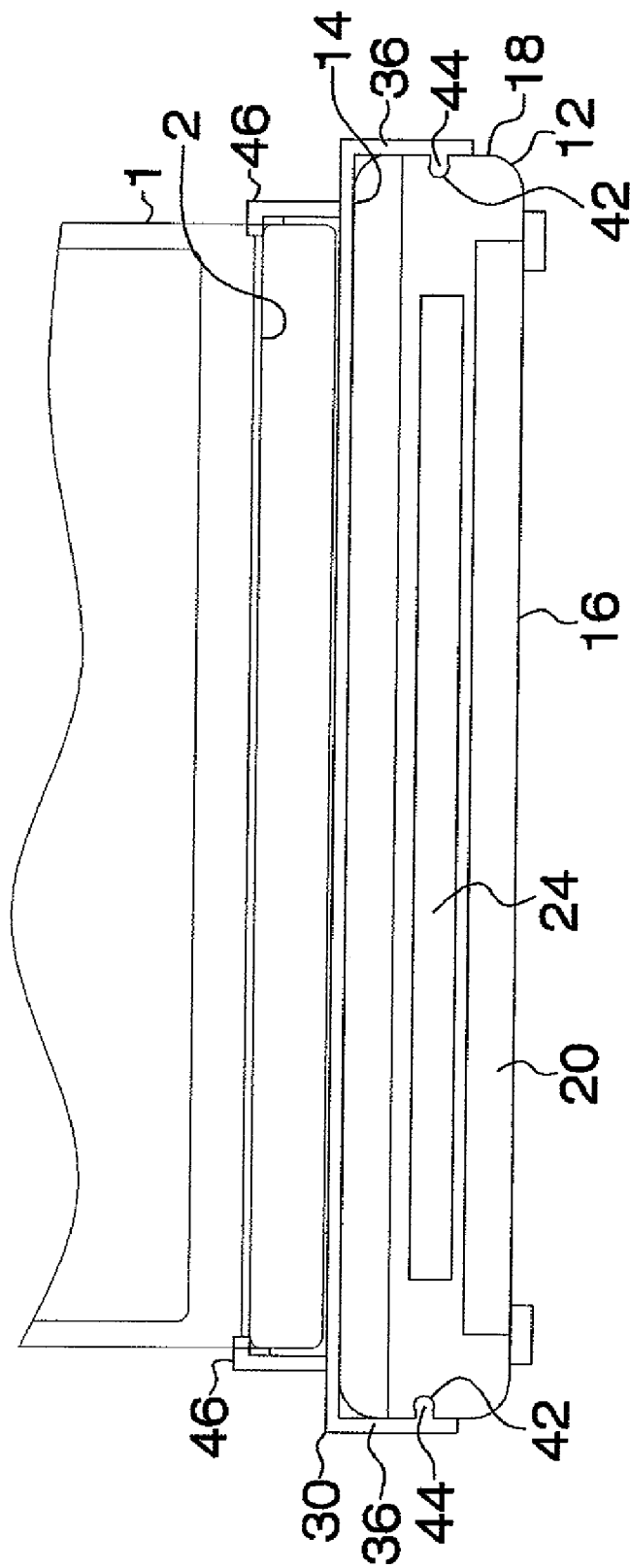
FIG. 4 is a front view of the present invention.
Figure 5:
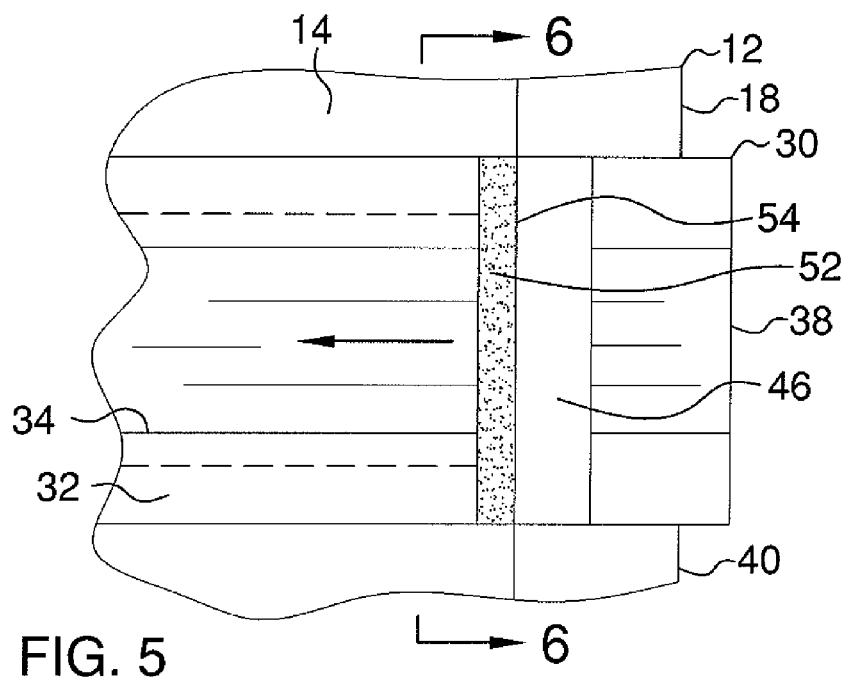
FIG. 5 is an enlarged top view of one of the arms of the present invention.
Figure 6:
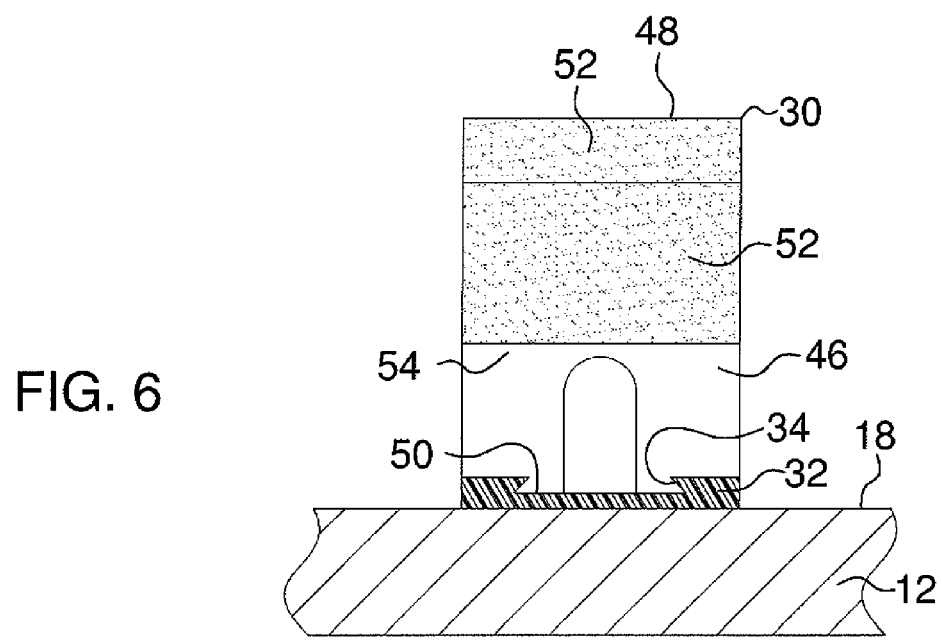
FIG. 6 is a cross-sectional view of the present invention taken along line 6-6 of FIG. 5.
Figure 7:
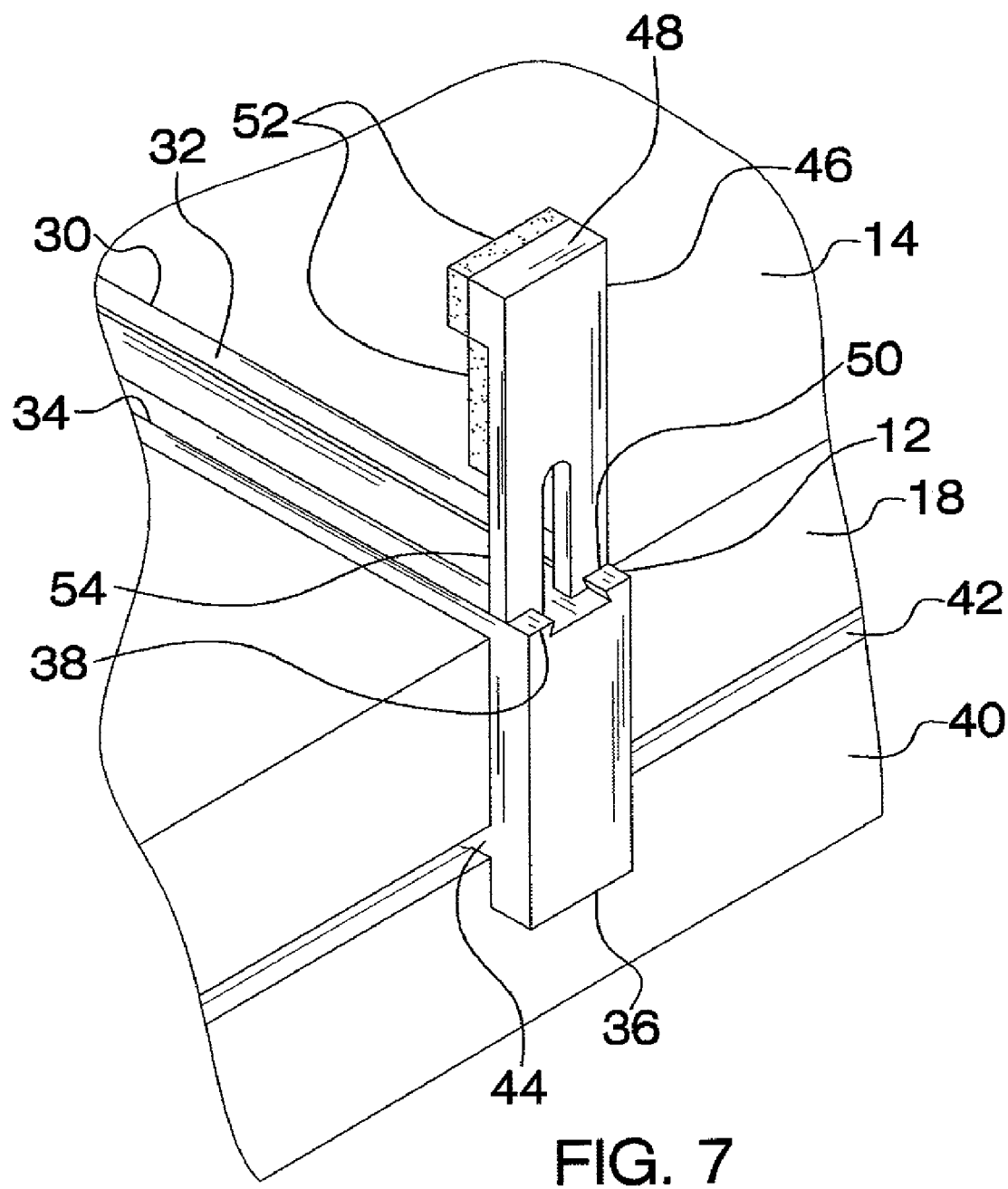
FIG. 7 is an enlarged perspective view of a portion of the clamping assembly of the present invention.

With reference now to the drawings, and in particular to FIGS. 1 through 7 thereof, a new portable printing device embodying the principles and concepts of the present invention and generally designated by the reference numeral 10 will be described.

As best illustrated in FIGS. 1 through 7, the computer docking system 10 generally comprises a printer 12 being electrically coupled to a laptop 1 to print information from the laptop 1. The printer 12 includes a top wall 14, a bottom wall 16 and a peripheral wall 18 extending between the top wall 14 and the bottom wall 16. The printer 12 is positioned under the laptop 1, wherein the laptop 1 is supported on the top wall 14 of the printer 12. The printer 12 includes a paper tray 20 extendable from a front wall 22 of the peripheral wall 18 with a document port 24 extending through the front wall 22 adjacent to the paper tray 20. A power button 26 for the printer 12 is positioned on a rear wall 28 of the peripheral wall 18 to turn the printer 12 on and off. The internal components and printing assembly of the printer 12 are conventional.

A clamping assembly 30 is mountable to the printer 12. The clamping assembly 30 clamps the laptop 1 to the printer 12 to secure the laptop 1 to the printer 12. The clamping assembly 30 includes a horizontal beam 32 extending across the top wall 14 of the printer 12. The horizontal beam 32 is positioned between the top wall 14 and the laptop 1 when the laptop 1 is positioned on the printer 12. The horizontal beam 32 has a channel 34 extending along a length of the horizontal beam 32. The channel 34 has a dovetail configuration. Each of a pair of side beams 36 is coupled to and extends downwardly from opposing ends 38 of the horizontal beam 32. Each of the side beams 36 extends across a portion of each of a pair of side walls 40 of the peripheral wall 18. A groove 42 of each of the side walls 40 slidably receives a tab 44 of an associated one of the side beams 36 to permit sliding adjustment of the location of the side beams 36 and the horizontal beam 32 along a width of the printer 12.

The clamping assembly 30 also includes a pair of arms 46. Each of the arms 46 is slidably mounted to and extends upwardly from the horizontal beam 32. Each of the arms 46 abuts opposing sides of the laptop 1 to secure the laptop 1 to the clamping assembly 30. Each of the arms 46 is approximately L-shaped. An upper end 48 of each of the arms 46 is extendable over a portion of the laptop 1 when the arms 46 abut the laptop 1. Each of the arms 46 includes a bottom end 50 inserted into the channel 34 of the horizontal beam 32 to permit selective sliding of the arms 46 along the horizontal beam 32. The bottom end 50 of each of the arms 46 is dovetail shaped to conform to the channel 34. Frictional contact between the arms 46 and the horizontal beam 32 inhibits inadvertent movement of the arms 46 along the horizontal beam 32.

The clamping assembly 30 additionally includes a plurality of pads 52. Each of the arms 46 has a pair of the pads 52 coupled to an interior face 54 thereof. One of the pair of pads 52 is positioned adjacent the upper end 48 to abut a top surface 2 of the laptop 1. One of the pair of pads 52 is positioned between the upper end 48 and the bottom end 50 of the associated one of the arms 46 to abut one of the opposing sides of the laptop 1. Each of the pads 52 is comprised of a resiliently compressible material to cushion the laptop 1 when the arms 46 abut the laptop 1.

In use, the printer 12 is placed on a support surface. The laptop 1 is then placed on the top wall 14 of the printer 12 and connected to the printer 12 by conventional connecting cables. The pair of arms 46 are then slid along the channel 34 of the horizontal beam 32 and abutted against the laptop 1. The pads 52 on the arms 46 cushion the laptop 1 and inhibit sliding of the laptop 1 with respect to the arms 46.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A computer docking system for receiving and printing information from a laptop, said system comprising:
    a printer being electrically coupled to the laptop to print information from the laptop, said printer including a top wall, a bottom wall and a peripheral wall extending between said top wall and said bottom wall, said printer being positioned under the laptop, wherein the laptop is supported on said top wall of said printer; and
    a clamping assembly being mountable to said printer, said clamping assembly clamping the laptop to said printer to secure the laptop to said printer, said clamping assembly including;
        a horizontal beam extending across said top wall of said printer, said horizontal beam being positioned between said top wall and the laptop when the laptop is positioned on the printer,
        a pair of side beams being coupled to and extending downwardly from opposing ends of said horizontal beam, each of said side beams extending across a portion of each of a pair of side walls of said peripheral wall.

2. The system according to claim 1, wherein each of said side walls has a groove slidably receiving a tab of an associated one of said side beams to permit sliding adjustment of the location of said side beams and said horizontal beam along a width of said printer.

3. The system according to claim 1, wherein said clamping assembly includes a pair of arms, each of said arms being slidably mounted to and extending upwardly from said horizontal beam, each of said arms abutting opposing sides of the laptop to secure the laptop to said clamping assembly.

4. The system according to claim 3, wherein said horizontal beam has a channel extending along a length of said horizontal beam, each of said arms including a bottom end being inserted into said channel of said horizontal beam to permit selective sliding of said arms along said horizontal beam.

5. The system according to claim 4, wherein said channel has a dovetail configuration, said bottom end of each of said arms being dovetail shaped to conform to said channel, frictional contact between said arms and said horizontal beam inhibiting inadvertent movement of said arms along said horizontal beam.

6. The system according to claim 3, wherein each of said arms is approximately L-shaped, an upper end of each of said arms being extendable over a portion of the laptop when said arms abut the laptop.

7. The system according to claim 6, wherein said clamping assembly includes a plurality of pads, each of said arms having a pair of said pads coupled to an interior face thereof, one of said pair of pads being positioned adjacent said upper end to abut a top surface of the laptop, one of said pair of said pads being positioned between said upper end and a bottom end of the associated one of said arms to abut one of the opposing sides of the laptop.

8. The system according to claim 7, wherein each of said pads is comprised of a resiliently compressible material to cushion the laptop when said arms abut the laptop.

9. A computer docking system for receiving and printing information from a laptop, said system comprising:
    a printer being electrically coupled to the laptop to print information from the laptop, said printer including a top wall, a bottom wall and a peripheral wall extending between said top wall and said bottom wall, said printer being positioned under the laptop, wherein the laptop is supported on said top wall of said printer;
    a clamping assembly being mountable to said printer, said clamping assembly clamping the laptop to said printer to secure the laptop to said printer, said clamping assembly comprising;
        a horizontal beam extending across said top wall of said printer, said horizontal beam being positioned between said top wall and the laptop when the laptop is positioned on the printer, said horizontal beam having a channel extending along a length of said horizontal beam, said channel having a dovetail configuration;
        a pair of side beams being coupled to and extending downwardly from opposing ends of said horizontal beam, each of said side beams extending across a portion of each of a pair of side walls of said peripheral wall, a groove of each of said side walls slidably receiving a tab of an associated one of said side beams to permit sliding adjustment of the location of said side beams and said horizontal beam along a width of said printer;
        a pair of arms, each of said arms being slidably mounted to and extending upwardly from said horizontal beam, each of said arms abutting opposing sides of the laptop to secure the laptop to said clamping assembly, each of said arms being approximately L-shaped, an upper end of each of said arms being extendable over a portion of the laptop when said arms abut the laptop, each of said arms including a bottom end being inserted into said channel of said horizontal beam to permit selective sliding of said arms along said horizontal beam, said bottom end of each of said arms being dovetail shaped to conform to said channel, frictional contact between said arms and said horizontal beam inhibiting inadvertent movement of said arms along said horizontal beam; and
        a plurality of pads, each of said arms having a pair of said pads coupled to an interior face thereof, one of said pair of pads being positioned adjacent said upper end to abut a top surface of the laptop, one of said pair of said pads being positioned between said upper end and said bottom end of the associated one of said arms to abut one of the opposing sides of the laptop, each of said pads being comprised of a resiliently compressible material to cushion the laptop when said arms abut the laptop.

10. A computer docking system for receiving and printing information from a laptop, said system comprising:
    a printer being electrically coupled to the laptop to print information from the laptop, said printer including a top wall, a bottom wall and a peripheral wall extending between said top wall and said bottom wall, said printer being positioned under the laptop, wherein the laptop is supported on said top wall of said printer; and a clamping assembly being mountable to said printer, said clamping assembly clamping the laptop to said printer to secure the laptop to said printer, said clamping assembly including;
- a horizontal beam extending across said top wall of said printer, said horizontal beam being positioned between said top wall and the laptop when the laptop is positioned on the printer;
- a pair of arms, each of said arms being slidably mounted to and extending upwardly from said horizontal beam, each of said arms abutting opposing sides of the laptop to secure the laptop to said clamping assembly.

11. The system according to claim 10, wherein each of said side walls has a groove slidably receiving a tab of an associated one of said side beams to permit sliding adjustment of the location of said side beams and said horizontal beam along a width of said printer.

12. The system according to claim 10, wherein said horizontal beam has a channel extending along a length of said horizontal beam, each of said arms including a bottom end being inserted into said channel of said horizontal beam to permit selective sliding of said arms along said horizontal beam.

13. The system according to claim 12, wherein said channel has a dovetail configuration, said bottom end of each of said arms being dovetail shaped to conform to said channel, frictional contact between said arms and said horizontal beam inhibiting inadvertent movement of said arms along said horizontal beam.

14. The system according to claim 10, wherein each of said arms is approximately L-shaped, an upper end of each of said arms being extendable over a portion of the laptop when said arms abut the laptop.

15. The system according to claim 14, wherein said clamping assembly includes a plurality of pads, each of said arms having a pair of said pads coupled to an interior face thereof, one of said pair of pads being positioned adjacent said upper end to abut a top surface of the laptop, one of said pair of said pads being positioned between said upper end and a bottom end of the associated one of said arms to abut one of the opposing sides of the laptop.

16. The system according to claim 15, wherein each of said pads is comprised of a resiliently compressible material to cushion the laptop when said arms abut the laptop.

17. A computer docking system for receiving and printing information from a laptop, said system comprising:
- a printer being electrically coupled to the laptop to print information from the laptop, said printer including a top wall, a bottom wall and a peripheral wall extending between said top wall and said bottom wall, said printer being positioned under the laptop, wherein the laptop is supported on said top wall of said printer; and
- a clamping assembly being mountable to said printer, said clamping assembly releasably clamping the laptop to said printer to secure the laptop to said printer.

* * * * *